Patented July 25, 1939

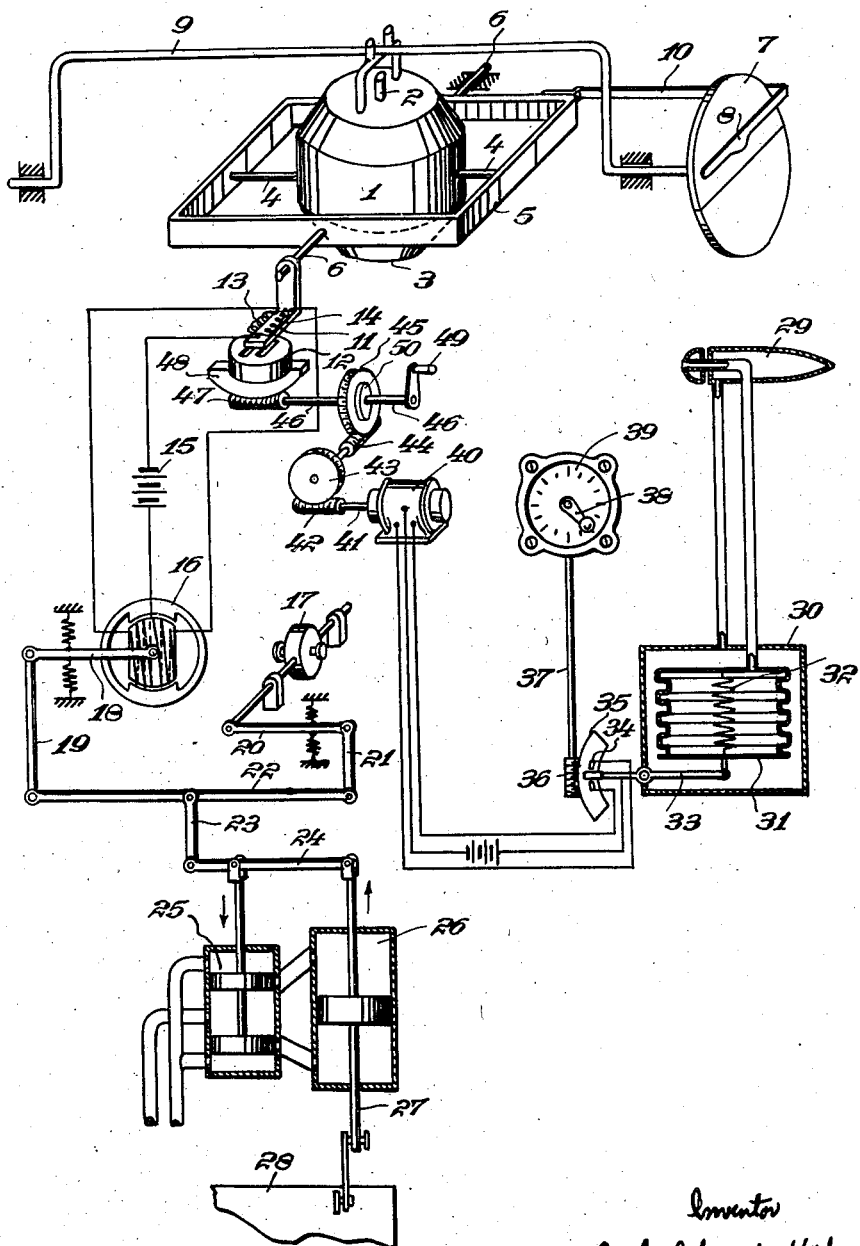

2,167,077

UNITED STATES PATENT OFFICE 2,167,077

CONTROL APPARATUS FOR AIRPLANES

Paul Eduard Köster, Berlin-Siemensstadt, Germany, assignor to Siemens Apparate und Maschinen G. m. b. H., a corporation of Germany Application November 3, 1936, Serial No. 108,985
In Germany November 7, 1935

5 Claims. (Cl. 244—76)

My invention relates to an apparatus for the speed combined and position control of aircraft by the altitude rudder by means of a gyroscopic apparatus which measures the longitudinal inclination of the aircraft, the elevator being adjusted by hand or automatically through a hydraulic or any other auxiliary motor.

An object of the invention is to control the longitudinal inclination of the aircraft in accordance with the speed. This is accomplished according to the invention by the fact that a part of a control device actuated by the gyroscopic apparatus is displaced by a speed responsive device till the gyroscope support and therewith the aircraft has assumed a longitudinal inclination corresponding to the desired speed without thereby changing the inclination of the gyroscopic apparatus.

In one form of embodiment of the invention one part of the control device is displaced by the speed responsive device in the manner that the latter actuates a reversing motor. In this case, it is necessary to maintain the adjusting speed at a comparatively low value in order to avoid oscillations such as rolling of the craft. To this end, a reduction worm gear having a high gear ratio is inserted between the reversing motor and the control device of the gyroscopic apparatus.

The figure of the drawing is a diagrammatic illustration of the mechanism.

Further details of the invention will be apparent from the following description taken in connection with the accompanying drawing in which is shown a gyroscopic horizon employed as an inclinometer.

Referring to the drawing, 1 denotes a gyroscope driven in any suitable manner and 2 is the axis of rotation thereof. The gyroscope 1 is mounted in a casing 3 which is supported in a Cardan ring 5 by means of trunnions 4. A horizon disc 7 and an airplane model 8 serve to indicate the position of the gyroscope. Rotational movements of the gyroscope about trunnions 4 which are parallel to the direction of flight are imparted to the disc 7 by means of a crank 9 while rotational movements about the trunnions 6 produce upward and downward movements of the airplane model 8 which is firmly secured to the Cardan ring 5 through an arm 10. A diaphragm 11 firmly secured to the trunnion 6 serves to control an air stream issuing from the two slots arranged on the top of a nozzle 12. The air stream is created preferably by a telephone diaphragm (not shown) energized by alternating current. 13 and 14 are resistors fed by a battery 15 and arranged in bridge connection with the windings of a rotary magnet 16. In addition to the gyroscope 1, a gyroscopic turn indicator 17 is provided as a further measuring device which is so mounted in the airplane as to indicate the angular speed of the rotational movement of the airplane about its transverse axis. The rotary magnet 16 and the gyroscopic turn indicator 17 cooperate through a system of levers 18, 19, 20, 21, 22, 23 and 24 with a control slide valve 25 of a servomotor 26 to actuate an elevator 28 through a piston rod 27.

29 is a Pitotstatic tube which influences a diaphragm 31 arranged in a casing 30 in a direction opposite to the action of a spring 32. The diaphragm 31 cooperates with contacts 34 through a contact lever 33. The contacts 34 are arranged on an arcuate gear 35 which meshes with a worm 36. The worm 36 is operated by a handle 38 through a spindle 37, the handle moving over a scale 39. The contacts 34 and contact lever 33 are connected through conductors to a reversing motor 40 which drives a reduction gear consisting of two worms 42 and 44 and two worm wheels 43 and 45. The reduction gear is connected through a shaft 46 to a worm 47 which in turn meshes with an arcuate gear 48 firmly secured to the nozzle 12. A handle 49 attached to the shaft 46 may, when actuated to disconnect the reduction gear with the aid of a sliding coupling 50, cooperate with the worm 47 also.

During normal flight a certain angle of attack of the airplane corresponds to a certain speed of flight. Since, however, the gyroscopic horizon has the tendency to remain always in the true vertical, this angle of incidence corresponds to a certain position of the nozzle 12. This means that at a certain speed of the airplane, the nozzle 12 must be so positioned that the diaphragm 11 firmly secured to the trunnion 6 covers symmetrically the slots from which the air stream issues. This nozzle position is controlled in the embodiment shown by a speedometer which operates as follows.

A pressure corresponding to the actual speed of the airplane is imparted to the diaphragm 31 by means of the static tube 29. The desired speed of the airplane is adjusted at the contacts 34 by the handle 38 and scale 39 through the spindle 37 and worm 36. In this case the scale 39 is so calibrated that when the desired speed adjusted thereon corresponds to the actual speed measured by the static tube, the arcuate gear is so positioned that the contact lever 33 actuated by the diaphragm 31 does not come into engagement with either contact 34. If now the actual speed of the airplane varies, the lever 33 comes into engagement with the one or the other contact 34. The reversing motor 40 is thus energized and actuates the arcuate gear 48 and, therefore, the nozzle 12 of the gyroscopic horizon through the reduction gear. In this position, the diaphragm 11 does not any longer obstruct the entire air stream issuing from the nozzle 12. The resistors 13 and 14 comprising part of the bridge connection and heated by the battery 15 are differently cooled, which causes a change in resistance and, therefore, a difference in the intensity of current flowing in both circuits. The rotary magnet 16 is thereby actuated which operates in a manner well known, the elevator 28. If the desired speed is attained, the contact lever 33 is brought out of engagement and the apparatus comes to rest. If the angle of incidence of the airplane varies owing to gusts or the like thus moving nozzle 12, the variations of the angle of incidence are compensated for by the operation of the diaphragm 11 controlled by the gyroscopic horizon which remains always in the true vertical, before the speedometer is influenced by an increase or decrease in speed.

The reduction gear designed for a high gear ratio as is required for the normal automatic control presents, however, a great disadvantage if a sudden change in speed or inclination is necessary. To remove this drawback the handle 49 is provided. Should, for instance, the pilot desire to attain another speed as quickly as possible, he adjusts the nozzle 12 with the aid of the handle 49 through the shaft 46, thereby eliminating temporarily by means of the sliding coupling 50 the control action of the pilot-tube through the reduction gear. The elevator will then be operated in the above-described manner. If the airplane has attained another speed, this speed is adjusted on the speedometer by means of the handle 38, whereupon the speedometer maintains the speed at a constant value.

The above-mentioned sliding coupling may, of course, be replaced by a differential gear or the like. Furthermore, it is evident that instead of employing the bolometer in connection with the gyroscopic horizon any other suitable arrangement may be employed.

I claim as my invention:

1. Apparatus for controlling the speed and position of an aircraft, comprising an elevator, a servo-motor for actuating said elevator, means responsive to the longitudinal inclination of said craft, means responsive to the rate of inclination of said craft, means responsive to the speed of said craft, and a two-part control device for controlling said servo-motor, one of said parts being actuated by said inclination responsive device and the other part being controlled by said speed responsive device, said rate responsive device differentially cooperating with said two part control to regulate said servo-motor.

2. Apparatus for controlling an aircraft, comprising an elevator, a servo-motor for actuating said elevator, means responsive to the longitudinal inclination of said craft, means responsive to the speed of said craft, a two part control device for controlling said servo-motor, one of said parts being actuated by said inclination responsive device and the other part being controlled by said speed responsive device, and manually operable means for disconnecting one of said responsive devices from said two part control.

3. Apparatus for controlling an aircraft, comprising means for controlling the attitude of said craft, power means for actuating said control means, means responsive to the longitudinal inclination of said craft, means responsive to the speed of said craft, a control device for controlling said power means, said control device being differentially actuated by said inclination responsive device and said speed responsive device, and manually operable means for disconnecting one of said responsive means and directly controlling said power means.

4. Apparatus for controlling an aircraft, comprising an elevator, a servo-motor for said elevator, means responsive to the longitudinal inclination of said craft, means responsive to the speed of said craft, a two part control device, one of said parts being connected to said inclination responsive means, motor means connected to said other part, a manually operable disconnecting means between said other part and said motor means, reversing means in the control circuit of said motor means, pivoted means actuated by said speed responsive means cooperating with said reversing means, and means for controlling the relative position of said reversing means and said pivoted means whereby the speed at which said reversing means is inoperative may be varied.

5. Apparatus for controlling an aircraft, comprising an elevator, means for controlling said elevator, means responsive to the speed of the craft, means actuating said controlling means, and means including step-down gearing connecting said speed responsive means and said actuating means for gradually applying the effect of said speed responsive means whereby oscillations of said craft are prevented.

PAUL EDUARD KÖSTER.